(No Model.)
H. P. LENTZ.
TREE EXTRACTOR AND CARRIER.
No. 572,902. Patented Dec. 8, 1896.
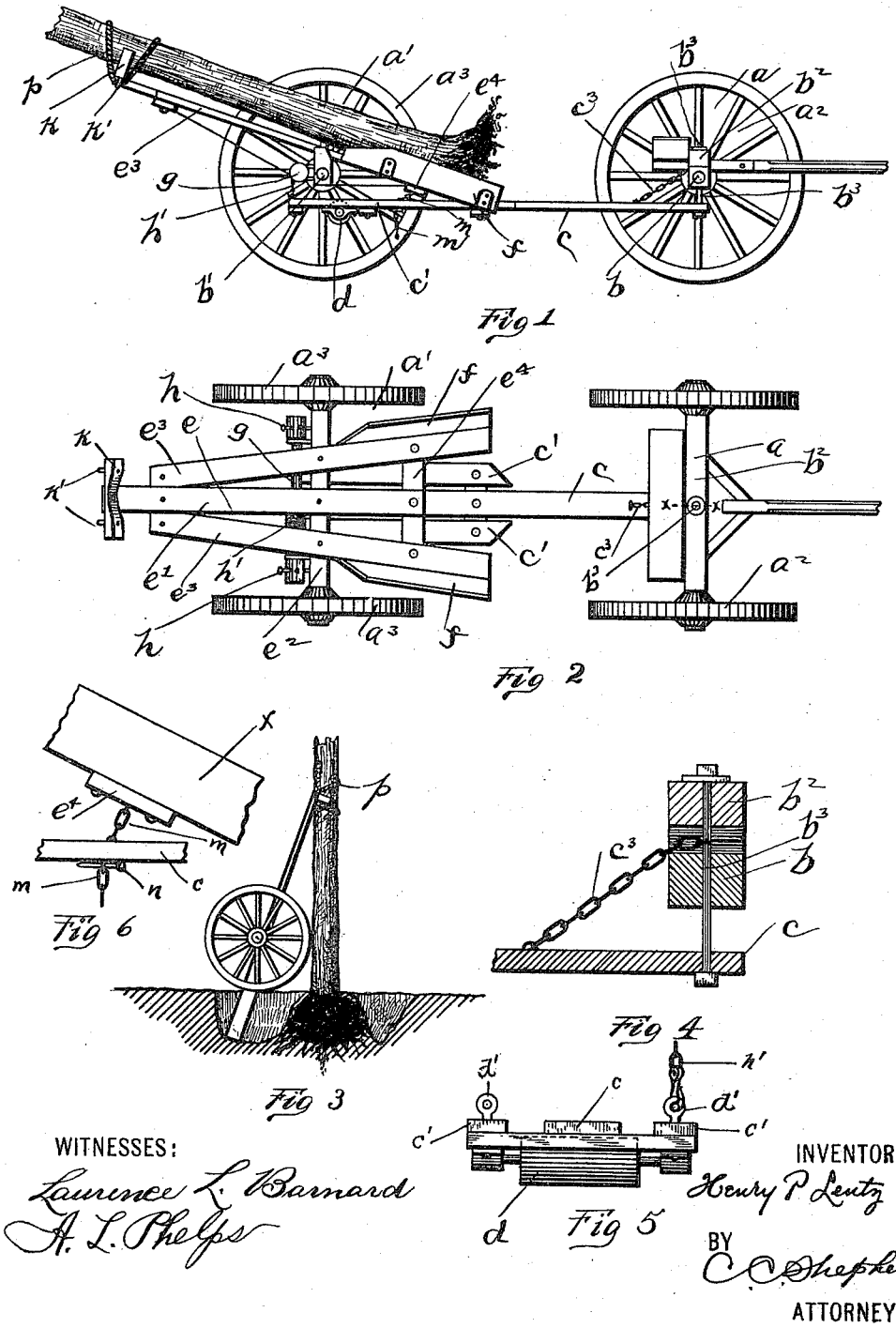
WITNESSES:
Laurence L. Barnard
A. L. Phelps
INVENTOR
Henry P. Lentz
BY
C. C. Shepherd
ATTORNEY

UNITED STATES PATENT OFFICE.

HENRY P. LENTZ, OF COLUMBUS, OHIO, ASSIGNOR OF ONE-HALF TO CHARLES W. HEYL, OF SAME PLACE.

TREE EXTRACTOR AND CARRIER.

SPECIFICATION forming part of Letters Patent No. 572,902, dated December 8, 1896.

Application filed September 8, 1896. Serial No. 605,205. (No model.)

*To all whom it may concern:*

Be it known that I, HENRY P. LENTZ, a citizen of the United States, residing at Columbus, in the county of Franklin and State of Ohio, have invented a certain new and useful Improvement in Tree Extractors and Carriers, of which the following is a specification.

My invention relates to that class of tree carriers and extractors which are employed in removing and transplanting trees, and has particular relation to the improvement of my former patent, No. 389,089, issued September 4, 1888.

The objects of my present invention are to provide an improved form of tree extractor and carrier of superior construction and arrangement of parts; to provide an improved framework; to provide improved means for elevating the truck-coupling board to the desired position, and to provide other improvements in details of construction and arrangement of parts, which will be more fully pointed out hereinafter. These objects I accomplish in the manner illustrated in the accompanying drawings, in which—

Figure 1 is a side elevation of my improved tree-carrier, showing a tree thereon in position for transportation, and for the sake of illustration showing the wheels on one side of the wagon removed. Fig. 2 is a plan view of the same with the tree removed. Fig. 3 is a detail view illustrating the position of the rear truck during the operation of extracting a tree. Fig. 4 is an enlarged sectional view on line $x\,x$ of Fig. 2. Fig. 5 is a detail end view of the truck-coupling frame; and Fig. 6 is an enlarged detail view in side elevation of portions of the coupling-frame and tree-carrier frame, showing the manner of connecting the same.

Similar letters refer to similar parts throughout the several views.

$a$ represents the front and $a'$ the rear truck of my improved carrier. Of these trucks $a^2$ and $a^3$ represent the wheels, which are mounted on axles $b$ and $b'$.

$b^2$ represents the front axle-bolster, through which and the axle passes the king-bolt $b^3$. With the lower end portion of this king-bolt is connected the forward end of a rearwardly-extending truck-coupling board $c$. As indicated more clearly in Fig. 4 of the drawings, this coupling-board is further connected with said king-bolt by means of a chain $c^3$, the forward end of which is secured to the king-bolt between the bolster and axle and the remaining end of which is secured to the board $c$ at a point in rear of the front axle.

The rear portion of the coupling-board $c$ has connected therewith and arranged on each side thereof frame-pieces $c'$, the latter extending in substantially parallel lines with said board $c$ and forming a part of the general framework of the latter. Beneath the rear portion of the coupling-frame $c$ is journaled transversely a ground-roller $d$. From the upper side of the rear end portion of each of the frame-arms $c'$ project eyes $d'$.

Upon the rear truck $a'$ of the wagon or carrier is mounted my improved tree-carrier frame $e$. This frame consists of a central plank or frame-piece $e'$, which is secured near the center of its length to the upper side and center of the length of the rear axle-bolster $e^2$. From the rear portion of the frame-piece $e'$ extend forwardly-diverging side arms or planks $e^3$, which project beyond the forward ends of the central plank $e'$, with which they are connected by means of a transverse frame-piece $e^4$. The forward end portions of the side frame-pieces $e^3$ are provided with outwardly and upwardly inclined side boards $f$.

Journaled in suitable bearings which project from the rear side of the rear axle is a windlass-shaft $g$, the latter being provided with enlarged end portions, and said enlarged end portions have formed therethrough on their peripheries at desired intervals openings adapted to receive stop and lever pins or rods $h$. Depending from opposite sides of the center of the shaft $g$ are supporting-chains $h'$, the lower ends of the latter being adapted to be hooked into engagement with the eyes $d'$ of the coupling-frame.

On the rear and projecting end of the central frame-board $e'$ of the carrier-frame is mounted transversely a tree-rest $k$, from the under side of which project eyes or staples $k'$.

From the under side of the frame cross-piece $e^4$ depends a chain $m$, which is adapted to pass through an opening in the coupling-board $c$ and have engaged with the desired one of its links below said coupling-board a pin $n$.

The manner of utilizing my device is substantially as follows: An excavation is formed about the root of the tree, as indicated more clearly in Fig. 3 of the drawings, and the rear truck of the wagon, which has previously been disconnected from the front truck by releasing the chain $m$ and chains $h'$ therefrom, is so supported as to cause the forward portions of the carrier-frame to stand within the excavation, while the narrower edge or outer portion of the said frame bears against the tree, as shown.

The upper end portion of the carrier-frame is, by means of ropes $p$, which are connected with the eyes $k'$, bound to the body of the tree. At the proper time the tree is pulled by ropes or otherwise over onto the tree-carrier frame, causing the wheels $a'$ of the rear truck to again resume their normal positions on the ground and bring the roots of the tree, together with the accumulated dirt thereon, onto the wider portion of the carrier-frame between the side boards $f$. The rear portion of the coupling-frame $c$ is then run beneath the carrier-frame, and the chains $h'$ hooked into engagement with the eyes $d'$, after which said chains are wound upon the shaft $g$ by inserting the pins $h$ in the openings of said shaft ends and exerting a lever-power thereon. By allowing these lever-pins to extend through the openings in said shaft it is obvious that their engagement with the adjoining axle will prevent a reversed rotation of the shaft. The chain $m$ may then be drawn downward through the opening in the board $c$ and secured at the proper point by means of the pin $n'$. In this manner it will be seen that the forward root-carrying portion of the carrier-frame will be made to bear upon the coupling-frame and the latter will be elevated to its normal or horizontal position.

In running the forward truck away from the rear truck it is obvious that the ground-roller $d$ will serve to prevent contact of the coupling-frame with the ground.

Owing to the employment of the chain $c^3$, it is obvious that the strain will be partially taken off of the extreme forward end of the carrier frame or board $c$.

From the construction and operation which I have described it will be seen that the trucks of my improved carrier may be readily disconnected from or connected with each other, and that the operation of loading and supporting a tree thereon is simple and convenient. It will also be observed that the construction of my improved tree carrier and extractor is such as to render the same strong and durable and admit of its production at a low cost of manufacture.

Having now fully described my invention, what I claim, and desire to secure by Letters Patent, is—

1. In a tree carrier and extractor the combination with the front truck $a$, a coupling-frame $c$ having its forward end connected therewith and a ground-roller $d$ journaled beneath the rear portion of said coupling-frame, of a rear truck, a carrier-frame supported on the axle of said rear truck and means for detachably and adjustably supporting the rear portion of said coupling-frame in connection with said rear truck, substantially as and for the purpose specified.

2. In a tree carrier and extractor the combination with the forward truck, a coupling-frame connected with said forward truck and a roller journaled beneath said coupling-frame, of the rear truck, a tree-carrier frame mounted on said rear truck, side boards on the forward end of said carrier-frame, a windlass-shaft journaled from said rear truck, chains depending from said shaft, said chains having a detachable connection with said coupling-frame and means for rotating said shaft, substantially as and for the purpose specified.

3. In a tree extractor and carrier the combination with the forward truck, a coupling-frame connected with the king-bolt thereof, a chain connecting said king-bolt with said coupling-frame at a point in rear of the axle and a roller journaled beneath said coupling-frame, of a rear truck, a tree-carrier frame mounted thereon and means for detachably connecting said rear truck with said coupling-frame, substantially as and for the purpose specified.

HENRY P. LENTZ.

In presence of—
C. C. SHEPHERD,
C. M. MORROW.